United States Patent

[11] 3,571,622

[72] Inventor Dieter Wallstein
Waldshut, Germany
[21] Appl. No. 747,573
[22] Filed July 25, 1968
[45] Patented Mar. 23, 1971
[73] Assignee Aktiengesellschaft Brown, Boveri & Cie
Baden, Switzerland
[32] Priority Sept. 8, 1967
[33] Switzerland
[31] 12627/67

[54] CURRENT PULSE GENERATOR FOR SIMULTANEOUS FIRING OF A PLURALITY OF THYRISTORS
2 Claims, 3 Drawing Figs.

[52] U.S. Cl. 307/252, 307/305
[51] Int. Cl. H03k 17/00
[50] Field of Search 307/252, 252 (D), 252 (L), 305, 284

[56] References Cited
UNITED STATES PATENTS
3,278,827 10/1966 Corey et al. 307/252
3,286,155 11/1966 Corez 307/252

*Primary Examiner*—Donald D. Forrer
*Assistant Examiner*—J.D. Frew
*Attorney*—Pierce, Scheffler and Parker ABSTRACT: A pulse current generator for producing current pulses having the required shape for simultaneous firing of a plurality of power thyristors comprises two parallel connected branch circuits which are connected to a source of supply voltage, each branch circuit containing an ohmic resistance and a control thyristor arranged in series and the primary windings of the current pulse transformers being arranged in series in one of the branch circuits.

PATENTED MAR 23 1971

3,571,622

INVENTOR.
Dieter Wallstein
BY
Price, Schuffler & Parker
Attorneys

CURRENT PULSE GENERATOR FOR SIMULTANEOUS FIRING OF A PLURALITY OF THYRISTORS

The present invention relates to an improved circuit for generating current pulses of a shape suitable for simultaneously firing a plurality of thyristors.

As will be explained in further detail hereinafter, current pulse generators for serving this purpose have already been developed but these have various disadvantages both as to cost and to satisfactory operation when it is required that a large number of power thyristors be fired simultaneously.

A primary object of the invention is accordingly to provide a rather low cost and highly satisfactory current pulse generator for producing current pulses of the desired shape which will fire a large number of thyristors simultaneously.

In the drawings which accompany this specification:

Figure 2:
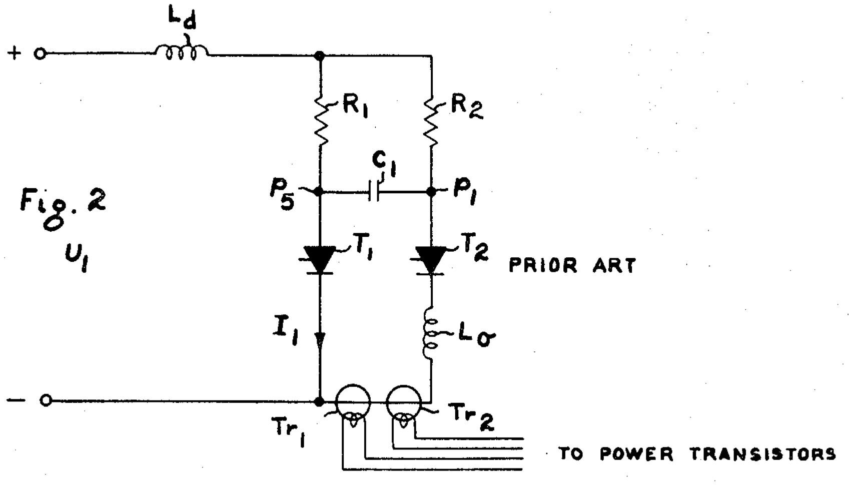
FIG. 2 illustrates parts of a known type of pulse generator circuit.

The known circuit arrangement, as depicted in FIG. 2 comprises a bistable sweep stage consisting of a first and a second parallel branch and at least one transverse branch, the first and second parallel branches each comprising a series circuit made up of a control thyristor $T_1$ and $T_2$ and an ohmic resistance $R_1$ and $R_2$ in the same sequence in each case, and one of the two parallel branches, which will hereinafter be called the "second parallel branch," furthermore comprising the firing current pulse transformers $Tr1$ and $Tr\ 2$ , and the transverse branch taking the form of a condenser $C_1$ connected between the junction points of the control thyristor and the resistance in the parallel branches, while the supply voltage $U_1$ is connected across the common points of the parallel branches, and the current pulse transformers $Tr1$, $Tr\ 2$ etc., for the power thyristors which it is required to fire are arranged in the second parallel branch with their primary windings in series with the ohmic resistance $R_2$ and the control thyristor $T_2$ of this parallel branch in this sequence, in such a manner that the end remote from the control thyristor $T_1$ of this primary winding series circuit goes to the corresponding common point $p$ of the two parallel branches.

Such known circuits, as illustrated in FIG. 2, for generating definite current pulses (see for example, as regards the bistable sweep stage, the "SCR Manual," 1964, published by General Electric, FIG. 5.9, p. 78 ) can be used for firing power thyristors if it is a matter of a single thyristor or a small number of thyristors. Since commercially available power thyristors often vary within wide limits in their firing current characteristics, it is necessary, in order to ensure that a relatively large number of thyristors connected in parallel or series will fire, that the front flank of the current pulse be made sufficiently high and steep to fire all the thyristors. Furthermore, the firing current pulse must, in many cases last for some time after the firing action, because when thyristors are fired their switching capacities tend to set up oscillations in conjunction with the load inductance, and oscillations can extinguish again the thyristor which has been fired shortly before. After about 100—500 $\mu$sec., these oscillations have died away to such an extent that a firing current pulse which still persists after this time can finally switch on the thyristor.

The above-mentioned circuit arrangements (for example the circuit according to FIG. 2) with a bistable sweep stage generate substantially rectangular current pulses of a length which may be chosen at will. The requirement set out above, namely, that the front flank of the firing pulse be made sufficiently high and steep, cannot, however, be fulfilled in this way without relatively great expenditure. The flank slope is in fact limited by stray inductances in the lead-in and in the current converters or pulse transformers. The pulse current flanks can be made steeper in the circuit according to FIG. 2 only be by increasing the supply voltage ($U_1$). In this condition, the whole "pulse plateau" would be lifted, but this would impose excessive requirements on the construction of the pulse current generator since the current value $I$ is usually predetermined by the transformation ratio of the pulse transformer and the minimum firing current.

The current pulse shape (corresponding to a rectangular pulse with "distorted" flanks) obtained with a circuit according to FIG. 2 (whereof the method of operation needs no further explanation) thus cannot be used for firing a relatively large number of thyristors without very heavy expenditure being incurred. As follows directly from the above remarks, an ideal firing current pulse for firing thyristors would have to exhibit the shape illustrated in FIG. 1, i.e. a high and steep front flank (in practical cases flank slope about 1—3 A.$\mu$sec., maximum current value about 1—3 A. and duration of high firing current peak about 10 to 20 $\mu$sec.) would have to be followed by an after-pulse of less height, in practice about 0.5 A. The duration of the after-pulse depends on the circuit, and should amount in the normal case to about 200—500 $\mu$sec.

Transistor control units have hitherto been used in order to attain such pulse shapes, and pulse transformers which effected potential separation of the thyristors connected to different operating voltages served to transmit the pulses to the firing electrodes of the thyristors.

Considerable expenditure is nevertheless involved in firing a large number of thyristors simultaneously with a transistor control unit. Trouble is very likely to be encountered in turning on the output stage transistors and working them in parallel. Because of the stray inductances which are always present in voltage pulse transformers and of the relatively low switching voltage of the output stage transistors, the firing current pulse is none too steep, values of more than 1 A.$\mu$sec. being scarcely attained.

Figure 1:
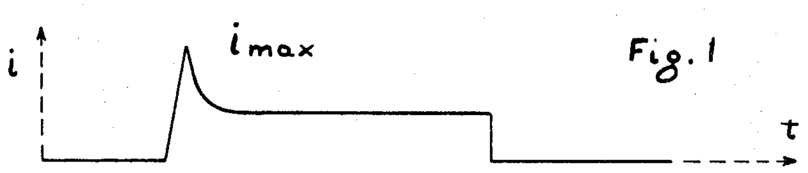
FIG. 1 illustrates a current pulse produced by the improved generator circuit in accordance with the invention.

The present invention proposes a circuit—developed from the circuit arrangement shown in FIG. 2—which enables a current pulse shape as illustrated in FIG. 1 to be obtained with simple means, with which shape it is possible to control the simultaneous firing action in the case of a large number of thyristors while maintaining an economical power consumption.

The circuit arrangement proposed according to the invention is characterized by the combination of the additional circuit-elements and connections enumerated hereinafter: a. a further transverse branch in parallel with the condenser of the aforesaid transverse branch, and made up by connecting a second condenser $C_2$ and a further ohmic resistance $R_3$ in series so that the end of this resistance remote from the second condenser $C_2$ is connected up between the resistance and the control thyristor $T_2$ of the second parallel branch, b. a connection to an auxiliary voltage source, $U_2$ made via a further ohmic resistance $R_4$ from point $p_2$ the end of the resistance $R_3$ in the second transverse branch remote from the condenser $C_2$ in the said branch, the voltage of the said source being greater than the supply voltage $U_1$ by an amount corresponding to the desired slope of the front flank of the firing current pulses. c. a first diode $D_1$ which is in parallel with the control thyristor $T_1$ of the first parallel branch, the connection being at point $p_3$, but with opposite polarity to this control thyristor $T_1$, so that at the instant when the control thyristor $T_2$ in the second parallel branch fires, an additional current path for the discharge of the condenser $C_2$ in the second transverse branch is formed, which path briefly (in accordance with the time-constant defined by the condenser $C_2$ and the resistance $R_3$ in the second transverse branch) causes an excess current to flow as compared to the normal value of current in the second parallel branch.

d. a second diode $D_2$ which is disposed in the second parallel branch between the connection point $p_1$ of the first transverse branch and the connection point $p_2$ of the second transverse branch, and in series with the ohmic resistance $R_2$ and the control thyristor $T_2$ of this parallel branch, the polarity of the said diode $D_2$ being such that no current can flow directly between the auxiliary voltage source $U_2$ and the main supply voltage source $U_1$.

According to a further feature of the invention, the terminal of the control thyristor $T_1$ associated in the first parallel branch with, and remote from, the ohmic resistance $R_1$ is taken via series-connected auxiliary windings on the pulse transformers T*r* 1 and T*r* 2 to the corresponding common point $p_4$ of the two parallel branches, and the sense of these auxiliary windings is so chosen that the current in the first parallel branch is used during the cutoff phase of the control thyristor $T_2$ in the second parallel branch in order to revere the magnetization of the pulse transformers T*r* 1, T*r* 2 by flowing through in the opposite direction.

Figure 3:
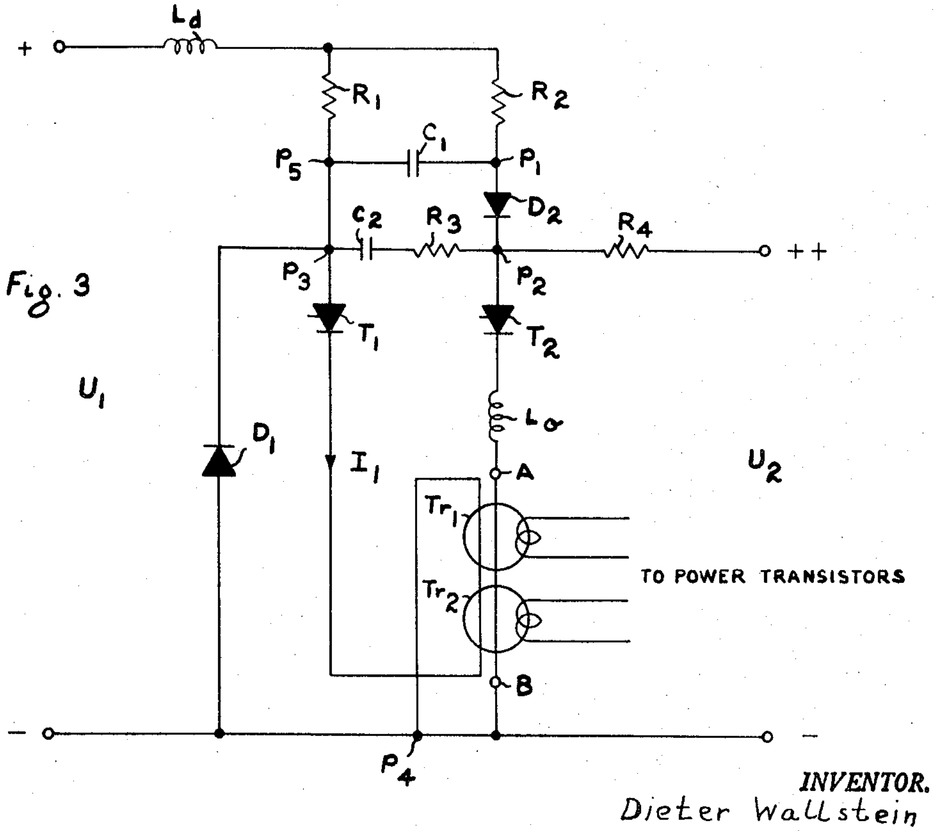
FIG. 3 illustrates the improved pulse generator circuit in accordance with the present invention and which has been developed from the circuit shown in FIG. 2.

The invention will now be more precisely explained with reference to FIG. 3. If the elements $C_2$, $R_3$, $R_4$, $D_1$ and $D_2$ are first of all imagined to be absent, one again has the bistable sweep circuit according to FIG. 2. In this circuit, let the current first of all flow via the first parallel branch $L_d$, $R_1$ and $T_1$, in which case $C_1$ is charged up via $R_2$ with the time-constant $R_2C_1$to the supply voltage $U_1$, so that point $p$ acquires a positive potential with respect to point $p_5$. If $T_2$ is now fired, $C_1$ discharges via $T_2$, and $T_1$ is extinguished, so that the current then flows with an amplitude of $U_1/R_2$ via the second parallel branch, i.e. $L_d$, $R_2$, $T_2$ and the firing current pulse transformers T*r*1 and T*r*2 in series therewith. It is thus possible to generate current pulses with a height of $U_1$ / $R_2$ and a duration which can be selected. In this connection, the flank slope is limited by the inductance $l_o$, which is essentially determined by the stray inductances of the lead-in and of the current converters or pulse transformers.

This disadvantage, which resides in the insufficient flank slope, is avoided by the circuit elements provided according to the invention. While $T_1$ is conducting, the condenser $C_2$ is charged up via the resistances $R_3$ and $R_4$ to the voltage $U_2$, which is considerably higher than $U_1$. When $T_2$ fires, $C_2$ discharges via $R_3$, $T_2$ and the additional diode $D_1$. This diode is in parallel with the thyristor $T_1$ in the "first parallel branch," but with opposite polarity to this thyristor, so that at the instant when the thyristor $T_2$ fires, a low resistance parallel current path for discharging $C_2$ is formed in addition to the thyristor $T_1$, which is just being extinguished, which path briefly (in accordance with the time-constant $C_2R_2$) sets up an excess flow of current in the second parallel branch $R_2$, $T_2$ as compared to the normal value of current. This excess impulse of discharge current, with a flank slope of $U_2/L_0$, and an amplitude of $U_2/R_3$, becomes superimposed on the current pulses generated by the function which has been described of the elements $U_1$, $L_d$, $R_1$, $R_2$, $C_1$, $T_1$ and $T_2$.

The current $I_1$ is used during the cutoff phase of $T_2$ to reverse the magnetization of the pulse transformers by flowing through in the opposite direction; this considerably increases the voltage-time area of the firing current pulse transformers which can be transmitted.

The diode $D_2$ has the function of keeping the higher voltage $U_2$ away from the condenser $C_1$ and blocking off the low resistance path $U_2$ —$R_4$ —$R_2$ —$R_1$ during the conductive phase of $T_1$.

I claim:

1. In the pulse current generator for producing current pulses of a shape suitable for simultaneously firing a plurality of power thyristors and which includes a bistable sweep stage consisting of first and second branch circuits connected in parallel to a main supply voltage source, each said branch circuit including a like series connection of a thyristor and an ohmic resistance, a first transverse branch comprising a first condenser connected across said first and second paralleled branches at points intermediate the thyristor and resistance, a current pulse transformer for each of the power thyristors to be fired, said current pulse transformers having their primary windings connected in series in said second branch circuit between the thyristor in said circuit and a common point of connection for said first and second branch circuits; the improvement which comprises:

a. a second transverse branch in parallel with said first transverse branch, said second transverse branch including a second condenser and a third ohmic resistance connected in series, the end of said third ohmic resistance remote from said second condenser being connected between the ohmic resistance and the thyristor of said second paralleled branch circuit;

b. an auxiliary voltage source connected by way of a fourth ohmic resistance to said end of said third ohmic resistance; the voltage of said auxiliary voltage source being greater than that of said main voltage supply source;

c. a first diode connected in parallel with said thyristor polar in said second paralleled branch circuit fires, an additional current path for the discharge of said second condenser is formed in said second paralleled branch circuit, said path in accordance with the time-constant defined by said second condenser and said third ohmic resistance causing an excess current to flow in said second paralleled branch circuit as compared to the normal value of the current, and d. a second diode connected in said second paralleled branch circuit between the connection point of said first transverse branch and the connection point of said second transverse branch circuit and in series with said ohmic resistance and said thyristor of said second paralleled branch circuit, the polarity of said second diode being such that no current can flow directly between said auxiliary voltage source and said main supply voltage source.

2. A pulse current generator as defined in claim 1 and wherein said current pulse transformers include auxiliary primary windings arranged in a series circuit, the connection of said auxiliary primary windings being made at one end of said series circuit to said thyristor in said first paralleled branch circuit at the side thereof remote from the ohmic resistance correlated thereto in said first paralleled branch circuit, and being made at the other end of said series circuit to the corresponding common point of said first and second paralleled branch circuits, the sense of said auxiliary primary windings being such that the current in said first paralleled branch circuit is used during the cutoff phase of said thyristor in said second paralleled branch circuit in order to reverse the magnetization of said current pulse transformers by flowing through the latter in the opposite direction.

PO-1050
(5/69)

UNITED STATES PATENT OFFICE
CERTIFICATE OF CORRECTION

Patent No. 3,571,622 Dated March 23, 1971

Inventor(s) DIETER WALLSTEIN

It is certified that error appears in the above-identified patent and that said Letters Patent are hereby corrected as shown below:

In claim 1, section c., first line,
"polar" (after "thyristor") should
cancelled and the following inserte
-- of said first paralleled bra
circuit but with opposite po
whereby at the instant when
thyristor --

Signed and sealed this 22nd day of June 1971.

(SEAL)
Attest:

EDWARD M.FLETCHER,JR.
Attesting Officer

WILLIAM E. SCHUYLER, JR.
Commissioner of Patents